No. 764,361. Patented July 5, 1904.

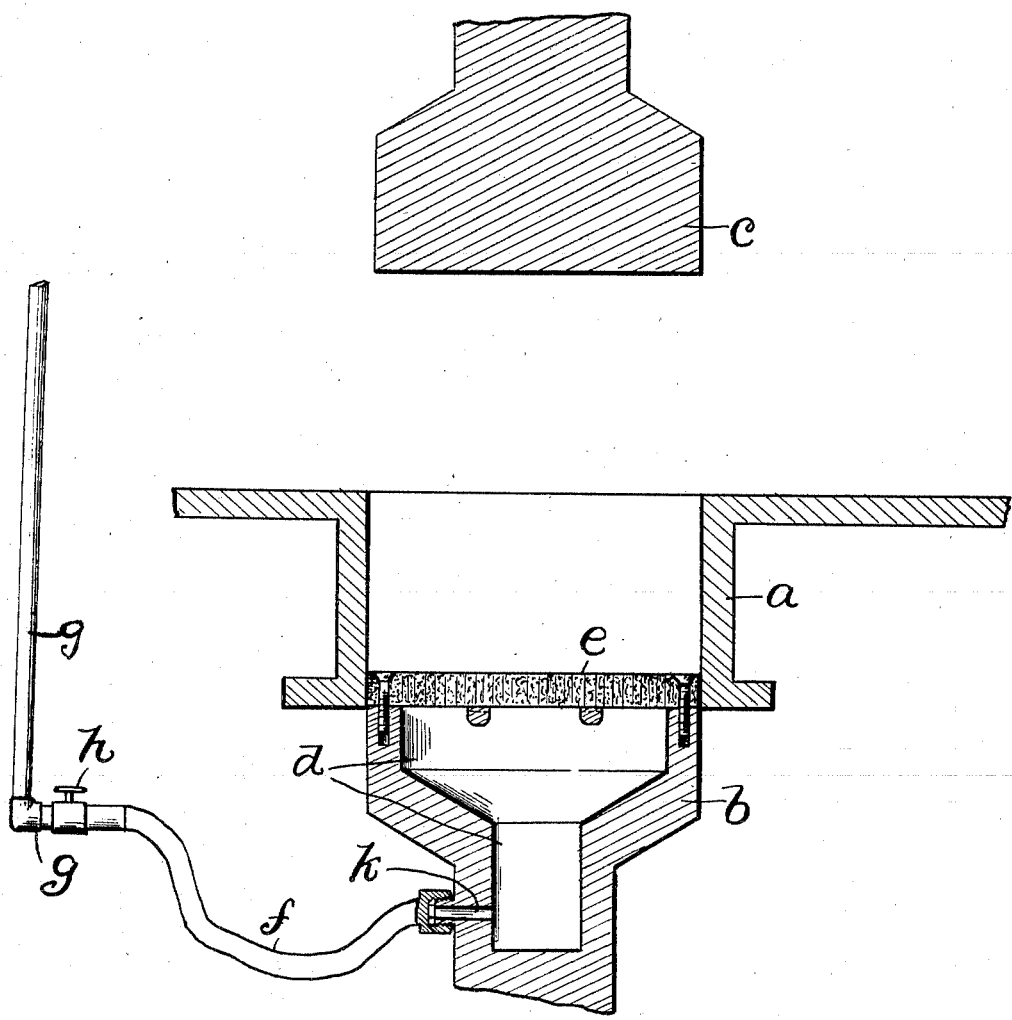

UNITED STATES PATENT OFFICE.

WILLIAM E. JAQUES, OF GRAND RAPIDS, MICHIGAN.

MAKING PRODUCTS OF CEMENT OR CEMENTITIOUS MATERIAL.

SPECIFICATION forming part of Letters Patent No. 764,361, dated July 5, 1904.

Application filed October 24, 1902. Serial No. 128,594. (No specimens.)

*To all whom it may concern:*

Be it known that I, WILLIAM E. JAQUES, a citizen of the United States of America, residing at Grand Rapids, in the county of Kent and State of Michigan, have invented certain new and useful Improvements in Making Products of Cement or Cementitious Material; and I hereby declare the following to be a full, clear, and exact description of the invention, such as will enable others skilled in the art to which it pertains to make and use the same.

This invention relates to improvements in making cement or cementitious products or artificial stone.

The primary object of this invention is to make a porous cementitious product—such, for instance, as a brick or block or slab or tile—of cement or cementitious material by first confining or compressing or compacting the solid particles of the material employed in making said product in a dry state, then by introducing moisture under pressure into the confined or partially-compacted mass rendering the cement or cementitious substance active to bind the solid particles of the mass together and cause each particle of sand or ground-rock material substituted for the sand to be incased or surrounded by the cement or cementitious matter, and then further mechanically compacting the wet or moistened mass of material into the product specified by pressure employed exteriorly of and to the said mass.

With this object in view and to the end of realizing other advantages hereinafter appearing my invention consists in the improved process and steps hereinafter described, and pointed out in the claims.

The accompanying drawing is a side elevation, largely in section, of apparatus suitable for use in carrying out the process which constitutes the subject-matter of this application.

Referring to the drawings, $a$ designates an open-ended interiorly-chambered vertically-arranged case, which forms the surrounding walls of the chamber of the mold wherein the mixed materials required to make a cement or cementitious product or artificial stone are compressed or compacted. The bottom of the mold is formed by a lower plunger $b$, which is capable of reciprocation vertically and extends into the lower end of the chamber of the case $a$ and snugly fits the said case internally. The top wall of the chamber of the case $a$ is during the operation of the mold formed by an upper plunger $c$, which is capable of reciprocation vertically and is adapted to extend into the upper end of the said chamber and snugly fit the case $a$ internally. Means for guiding and operating pressure-exerting plungers are too well known in the art to require description and illustration in this application. The mass which is to be compressed or compacted in the mold is fed or introduced into the chamber of the mold over the mold-bottom-forming lower plunger in any approved manner and is operated upon by the plungers. When a product has been formed in the mold, the upper plunger is elevated far enough to accommodate the elevation of the product out of the chamber of the mold by actuating the lower plunger far enough upwardly, whereupon the elevated product can be removed in any approved manner. The lower plunger is chambered interiorly, as at $d$, and the pressure-exerting face or head of the said plunger is formed, preferably, of a porous stone or slab $e$, applied in any approved manner. Said porous stone or slab $e$ also forms the upper wall of said chamber in said lower plunger. A hose or flexible tube $f$ is in open relation with the said chamber $d$, communicating at one end with an aperture $k$, which is formed in one of the walls of the said chamber. The hose or tube $f$ is connected at its other end with a pipe $g$, employed to conduct or supply steam or hot water under pressure to the said tube $f$ and provided with a normally closed valve $h$. Obviously, therefore, moisture is supplied to the chamber of the mold upon opening the valve $h$.

The materials used in making the compactible cementitious mass which is to be compressed or compacted in the mold comprises in its composition hydraulic cement or any suitable cementitious substance and sand or ground-rock material or any dry material which is to be substituted for the sand or rock material. Sand and cement are preferably employed and mixed together in a dry state in the proportions, by weight, of about one part of the cement to two parts of the sand. The dry mixture of sand and cement is then fed or introduced into the chamber of the mold over the mold-bottom-forming lower plunger, as already indicated, whereupon the upper plunger is lowered or depressed into the mold far enough to exert pressure upon the dry mixture, and thereby partially compact the latter. While said dry mixture is being compacted or under pressure, the valve $h$ of the pipe $g$ is opened to permit the passage of steam or hot water, as the case may be, into the chamber of the mold through the pores of the mold-bottom. The hot fluid thus passing into the mass under pressure enters the interstices, spaces, or pores between the solid particles of the mass and impregnates the mass throughout without hot moisture, so as to cause each particle of sand to be incased or completely surrounded by cement. The water or moisture resulting within the mold from the condensation of the steam introduced into the mold reaches every particle of cement contained in the mass and the cement is rendered active. This activity of the particles of cement developed by the introduction of the moisture into the mold results in the incasing of each particle of sand with cement, as already indicated, and causes the solid particles of the mass to become bound together. When the mixture of sand or substituted material with cement or cementitious substance has been wet or moistened, as hereinbefore described, the upper plunger is lowered or depressed still farther, so as to result in further mechanically compacting the mass. The supply of moisture to the mold may be cut off next preparatory to the additional mechanical compression or compacting of the mass by closing the valve of the steam-supply pipe, or moisture-supplying fluid may, if required, be permitted to pass into the mold during the said compacting of the mass. I would here remark that the use of hot moisture in wetting the confined cementitious mass is advantageous, more especially in cold weather, to prevent freezing or chilling while the product is setting and until the danger of frosting is past. Also hot moisture hastens or facilitates setting and hardening of the product. The resulting product is porous and homogeneous.

What I claim is—

1. An improvement in making a cement or cementitious product or artificial stone consisting in mixing sand, or substituted material, with cement or cementitious substance in suitable proportions; then compacting the mixture and impregnating it with moisture, and then mechanically compacting the wet or moistened mass by pressure mechanically applied at the exterior of the mass.

2. An improvement in making a cement or cementitious product or artificial stone, consisting in mixing sand or substituted material and cement or cementitious substance in suitable proportions; then placing the mixture under pressure and impregnating it while under pressure with moisture under pressure; then mechanically compacting the mass by pressure mechanically applied to the exterior of the mass and continuing the introduction of moisture into the mass during the additional compacting of the mass.

3. An improvement in making a cement or cementitious product or artificial stone, comprising a mixing of sand or substituted material with cement or cementitious substance in a dry state; then confining the said mass within a mold; then exerting pressure upon the mass and at the same time introducing moisture into the mold and distributing or disseminating the said moisture throughout the mass, and then mechanically compacting the wetted or moistened mass by pressure mechanically applied at the exterior of the mass.

4. An improvement in making a cement or cementitious product or artificial stone, consisting in first preparing a dry mixture of the solid particles of the ingredients of a cementitious mass required to make the said product; then compacting the said mixture and introducing hot moisture into the mass while the latter is under pressure, and mechanically compacting the mass when the latter has been impregnated with hot moisture by pressure mechanically applied at the exterior of the mass.

In testimony whereof I sign the foregoing specification, in the presence of two witnesses, this 4th day of October, 1902, at Detroit, Michigan.

WILLIAM E. JAQUES.

Witnesses:
 BENJ. F. MULFORD,
 NELLIE READY.